(12) United States Patent
Dance

(10) Patent No.: US 6,937,272 B1
(45) Date of Patent: Aug. 30, 2005

(54) DISPLAY DEVICE FOR A CAMERA

(75) Inventor: Christopher R. Dance, Trumpington (GB)

(73) Assignee: Xerox Corporation, Stamford, CT (US)

( * ) Notice: Subject to any disclaimer, the term of this patent is extended or adjusted under 35 U.S.C. 154(b) by 887 days.

(21) Appl. No.: 09/707,922

(22) Filed: Nov. 8, 2000

(51) Int. Cl.$^7$ .............................................. H04N 5/228
(52) U.S. Cl. ............................. 348/208.2; 348/333.05
(58) Field of Search ....................... 348/208.2, 208.3, 348/208.12, 333.01, 333.12, 333.05, 333.11, 348/231.3, 208.1; 345/158

(56) References Cited

U.S. PATENT DOCUMENTS

| | | | |
|---|---|---|---|
| 4,906,843 A | | 3/1990 | Jones et al. ................. 250/221 |
| 4,926,269 A | * | 5/1990 | Takano et al. .............. 358/474 |
| 5,585,875 A | * | 12/1996 | Imafuji et al. ......... 348/208.11 |
| 5,602,566 A | * | 2/1997 | Motosyuku et al. ........ 345/684 |
| 5,714,972 A | * | 2/1998 | Tanaka et al. .............. 345/156 |
| 5,748,228 A | * | 5/1998 | Kobayashi et al. ........... 348/63 |
| 5,844,824 A | | 12/1998 | Newman et al. ............ 364/708 |
| 5,905,525 A | * | 5/1999 | Ishibashi et al. ............. 348/39 |
| 5,943,603 A | * | 8/1999 | Parulski et al. .......... 348/211.2 |
| 6,011,526 A | | 1/2000 | Toyoshima et al. ............ 345/7 |
| 6,233,015 B1 | * | 5/2001 | Miller et al. ............. 348/33.05 |
| 6,300,933 B1 | * | 10/2001 | Nagasaki et al. ........... 345/685 |
| 6,411,275 B1 | * | 6/2002 | Hedberg ....................... 348/39 |
| 6,476,861 B1 | * | 11/2002 | Min ....................... 348/208.15 |
| 6,552,744 B2 | * | 4/2003 | Chen ....................... 348/218.1 |

OTHER PUBLICATIONS

Verplaetse, "Inertial Proprioceptive Devices: Self-motion-sensing Toys and Tools," 1999, IBM Systems Journal, vol. 35, Nos. 3&4, 639-650.*
E. Foxlin and N. Durlach, "An Inertial Head Orientation Tracker with Automatic Drift Compensation Doe Use with HMD's," Proceedings from VRST'94, Virtual Reality Software and Technology, Singapore, Aug. 23-26, 1994.
C. Verplaetse, "Inertial Proprioceptive Devices: Self-motion-sensing Toys and Tools," IBM Systems Journal, vol. 35, Nos. 3&4, 1996, pp. 639-650.

* cited by examiner

*Primary Examiner*—Tuan Ho
*Assistant Examiner*—Gevell Selby

(57) ABSTRACT

A camera is described having a display device for displaying one or more stored images after acquisition. The camera has a motion detector which enables the selection and/or display of a stored image to be controlled (at least partly) by physical movement of the camera. Scrolling (or panning) of an image in the display can be effected by moving the camera in a plane parallel to the plane of the camera display, or tilting the camera. Zooming can be effected by moving the camera is a direction generally perpendicular to the plane of the camera display. The movements are generally similar to those which the user would make if viewing the image through a window or lens, which leads to a highly intuitive manner of operation.

22 Claims, 6 Drawing Sheets

DISPLAY DEVICE FOR A CAMERA

BACKGROUND OF THE INVENTION

1. Field of the Invention

This invention relates to a display device for a camera, and to a method for controlling the display device. The invention relates in particular to a display device for displaying a stored image, for example, an image previously recorded by, and stored in, the camera.

The invention is particularly, but not exclusively, suited to document image cameras, i.e. cameras adapted for imaging documents, rather than general photography cameras. However, the invention is applicable to all forms of camera (for example whether they be document cameras, or general digital cameras, or video cameras) in which a display device is provided for displaying a stored image.

2. Description of Related Art

The displays on hand held digital cameras, and hand held video cameras, tend to be small. This is a result of the relatively high cost of current displays, and the desire for compactness for a portable camera.

Particularly when a stored image is a document image, in order to enable the document image to be reviewed in detail, a facility must be provided to enable zooming and scrolling of the document image in the small display. Additional manually operable controls are therefore required on the camera to enable the user to select an image to view, and then to zoom and scroll the display over the retrieved image.

The conventional approach is to provide additional control buttons on the camera, to provide the necessary control of the display. However, such an approach increases the complexity of the interface with the user. It is often difficult for a user to press the correct buttons, or simultaneous combination of buttons, to provide an optimal path to the region of the image to be viewed. The user may also have to take his or her eyes off the image to locate the desired control buttons, which makes the camera less convenient, and slower, to use. Moreover, control buttons do not enable the user to control variably the scroll speed or the zoom speed.

A touch sensitive display could be provided to allow the user to control the image by touching or dragging areas on the display screen. However, this normally requires both hands if the user is holding the camera. Touch screens can also be difficult to use particularly on small displays. If the user's finger is large relative to the display, then the finger cannot be moved very far and the finger occludes the user's view of the image. Additionally, a small display will usually be near the user's eye, which makes the display difficult to access with the finger. Such closeness also means that the user's finger and the display itself will not be simultaneously in focus.

U.S. Pat. No. 5,844,824 describe a hands-free portable computer which uses eye-tracking for shifting the effective field of view in the display. However, such displays are more complex and expensive, and presently less reliable to use.

Reference may be made to head-mounted displays (e.g. U.S. Pat. No. 6,011,526) and to tip-tilt Personal Data Assistants (PDA's).

SUMMARY OF THE INVENTION

It would be desirable to provide a camera with an interface for reviewing stored images, which can provide an easier, more intuitive way of controlling the display of a region of an image.

In contrast to the prior art techniques described above, broadly speaking one aspect of the present invention is to provide an interface for viewing stored images, wherein the selection and/or display of a stored image is controlled (at least partly) by physical movement of the camera.

This can provide a much more straightforward interface for the user, without the difficulty of finding, and trying combinations of buttons to control the display. It is also less fatiguing to the users.

In a preferred form, many of the image or display control operations are simply movements which the user would make if viewing the images through a lens or window. This can provide a highly intuitive manner of operation.

The motion interface may be used for controlling the selection of an image to view from a selection scene, and/or for controlling the display of a stored image after selection.

The invention may be embodied as, or in, a camera, or a method of operation, or a program for controlling or implementing such a method when run on a processor.

BRIEF DESCRIPTION OF THE DRAWINGS

An embodiment of the invention is now described by way of example only, with reference to the accompanying drawings, in which.

DETAILED DESCRIPTION

Figure 1:
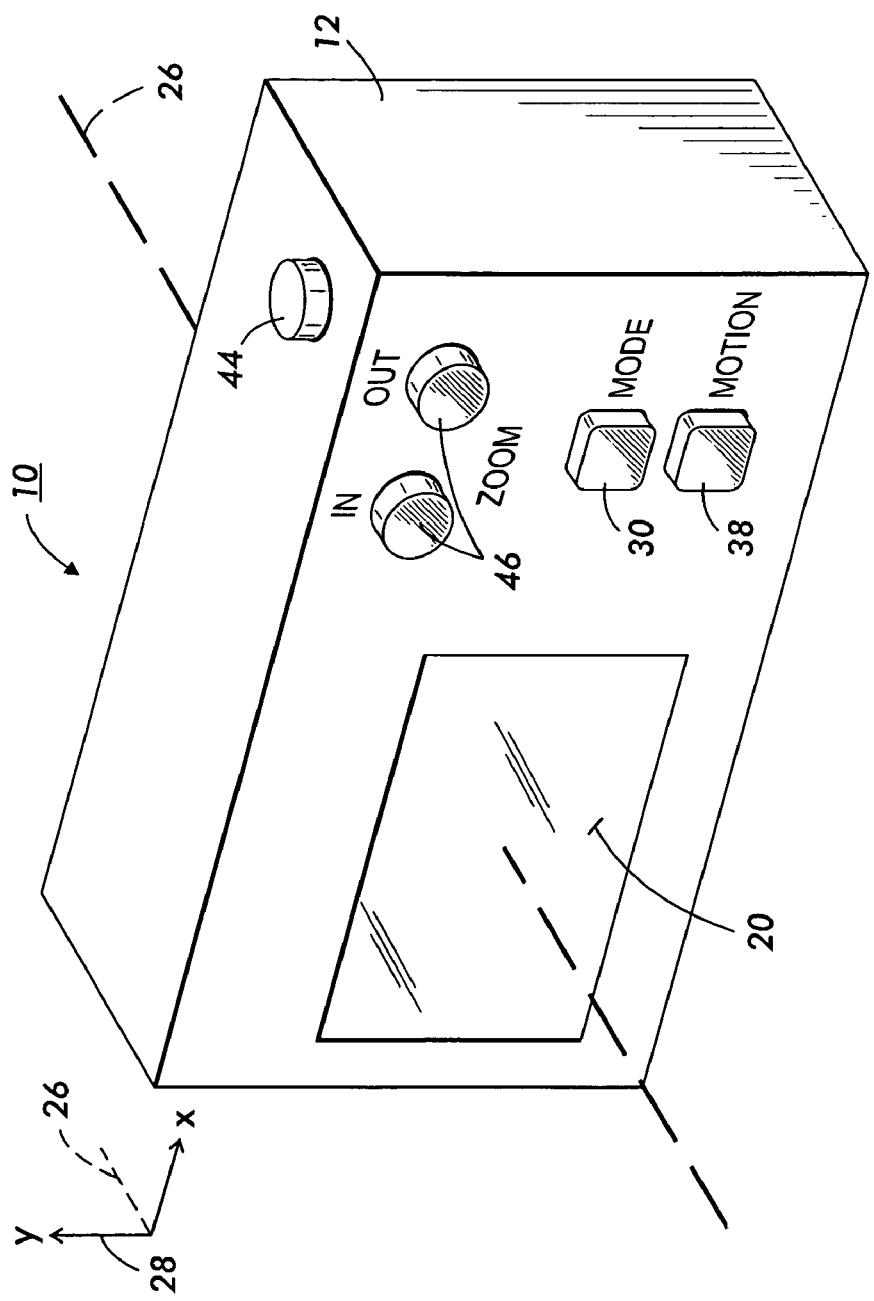
FIG. 1 is a schematic perspective rear view of a document imaging camera.

Referring to the drawings, a portable document imaging camera 10 comprises a camera housing 12. As used herein, the term "document" camera refers to a camera which is configured or adapted to make it especially suitable for capturing or encoding or reviewing document images. The camera therefore has a resolution sufficient to enable subsequent document processing of the document image.

The camera 10 includes a conventional lens and shutter assembly, a conventional photoelectric input device for capturing the image, and a conventional recording device for recording the image onto a storage medium 14. The medium may, for example, be a semiconductor memory, or an optical disc, or a magnetic disc, or a magnetic tape. Suitable constructions for the above conventional sections are well known to the skilled man, and so need not be described here in detail.

The camera 10 also includes an interface 16 for enabling the camera 10 to communicate with an external device 18, to allow images stored in the camera to be uploaded into the external device 18. The interface 16 also permits images to be downloaded from the external device 18 into the camera 10. The interface may be a connector socket, or it may be a wireless interface, for example, a wireless LAN connection.

The camera housing 12 carries a display device 20 for displaying images, to enable the user to view images prior to storage, and to view images after storage. In this embodiment, the display device 20 is mounted on the rear of the camera housing 12, and consists of a multi-pixel LCD display.

For controlling the display of stored images, the camera 10 includes an image rendering circuit 22 for creating the image to be displayed on the display device 20. The image rendering circuit 22 receives image data from the storage medium 14, and composes an image for display. The image rendering circuit 22 provides the following image-processing functions:

(a) Synthesis of a selection scene of a plurality of stored images, to permit selection of an image from the plural images;

(b) Scrolling or panning of the selection scene;

(c) Scrolling or panning of a stored image; and (d) Zooming of a stored image.

The camera also comprises a motion sensing device 24 for sensing movement of the camera. The output from the motion sensing device 24 is fed as a control input to the image rendering circuit 22, to control the displayed image based on the user's movement of the camera.

The motion sensing device 24 may be a device which detects motion in two dimensions, for example, movement in a plane to effect scrolling of the display in a corresponding direction of the display device 20. For example, the plane may be perpendicular to a predetermined axis 26 relative to which motion is judged. As illustrated by the arrows 28 in FIG. 1, the plane may be generally parallel to the plane of the display device 20.

Additionally, or alternatively, the motion sensing device 24 may detect the attitude of the camera 10, so that tilting the camera in a certain direction effects scrolling of the display in a corresponding direction of the display device 20. This might be advantageous if, for example, the camera is used in small space or if it is not practical to move the camera significantly.

The motion sensing device 24 may also detect movement in three dimensions, such that movement in a direction parallel to the axis 26 may also be detected. Such movement may be used to effect zooming of the display. The zoom may either be such that movement of the camera away from the user effects magnification (in a similar manner to moving a camera toward a hypothetical object), or it may be such that movement of the camera towards the user effects magnification (in a manner similar to bringing a piece of paper nearer to the user's eyes).

Example motion detection devices for detecting camera movement are described later.

Figure 3:
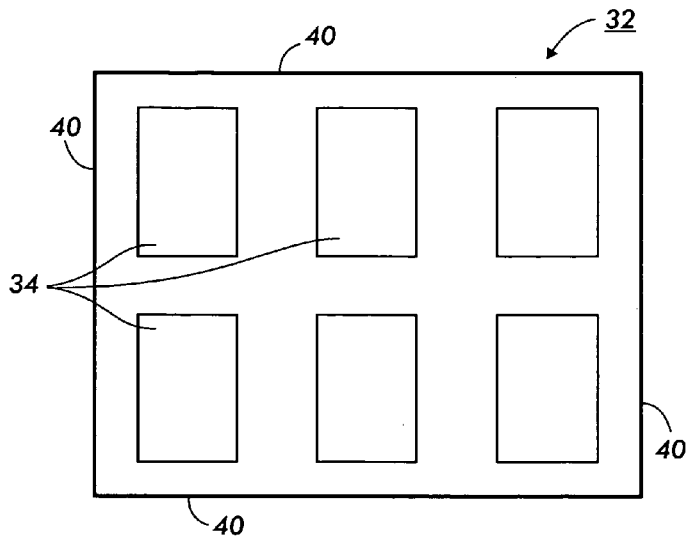
FIG. 3 is a schematic illustration of an image selection scene.

The rendering circuit 22 also receives an input from a mode input device 30, in the form of a manually operable push button, for selecting one or more operating modes of the camera. In the present embodiment, the mode input device 30 is operable to initiate a scene selection mode, which causes the image rendering circuit 22 to generate the synthesized image selection scene for display on the display device 20. Referring to FIG. 3, the selection scene 32 consists of a plurality of icons or thumbnail views 34 representing the stored images. Each thumbnail view 34 may be a low-resolution rendering of the image it represents or, in the case of a video clip, a low-resolution rendering of a key image from the clip.

The selection scene 32 may be a one-dimensional (e.g. horizontal) array of the icons or thumbnail views or, as illustrated in FIG. 3, the selection scene 32 may be a two-dimensional array. The order of the icons/thumbnail views 34 preferably indicates the order in which the images were acquired.

Figure 4:
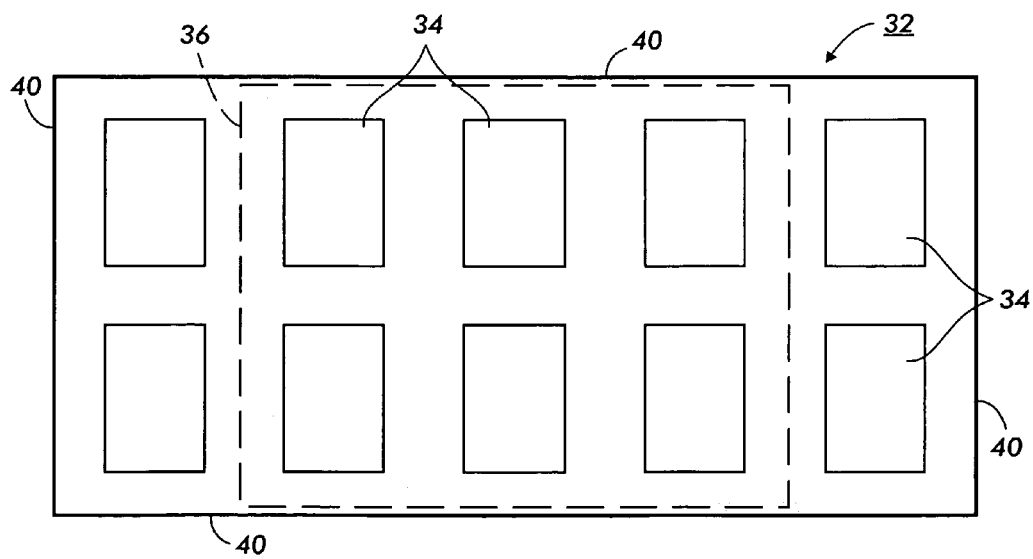
FIG. 4 is a schematic illustration of a larger image selection screen.

In the present embodiment, the size of the icons/thumbnail views 34 is such that the display device 20 can display up to six icons/thumbnail views simultaneously, as illustrated in FIG. 3. However, referring to FIG. 4, if the number of icons or thumbnail views 34 exceeds the number which can be displayed, then the display device displays a panable window 36 within the generated selection scene 32. Although in the illustrated embodiment, the icons/thumbnail views 34 have a fixed size, the size could be made to vary depending on the size of the stored image. This would enable the user see clearly the relative size or scale of each image.

The image rendering circuit 22 receives a further input from a "motion interface selection" input device 38, in the form of a push button, for enabling image control by motion of the camera. The input may either be a push button which the user has to press continuously while the motion interface is enabled, or it may be a simple on/off selection button.

When enabled by the motion interface selection input device 38, the panable window 36 can be panned left or right, or up and down, within the selection scene, by corresponding movement of the camera. As described above, the detected movement is fed as an output from the motion sensing device 24 to the image rendering circuit 22, to control the displayed image.

The peripheral boundaries 40 of the selection scene 32 are highlighted in the display, for example, by red borderlines, so that the user can identify the "edges" of the generated scene. The rendering circuit 22 can be configured either to prevent the panable window 36 from moving outside the selection scene, or to "wrap" the selection scene as a continuous loop, such that movement of the panable window 36 past a boundary 40 causes the scene to repeat.

The image rendering circuit 22 receives a further input from a scene selection input device 42, in the form of a manually operable push button, which may conveniently be the same button as the shutter release button (shown in FIG. 1 as 44). Pressing this button selects the icon or thumbnail view 34 currently in the center of the display, so that the corresponding stored image or video clip is then displayed.

Figure 2:
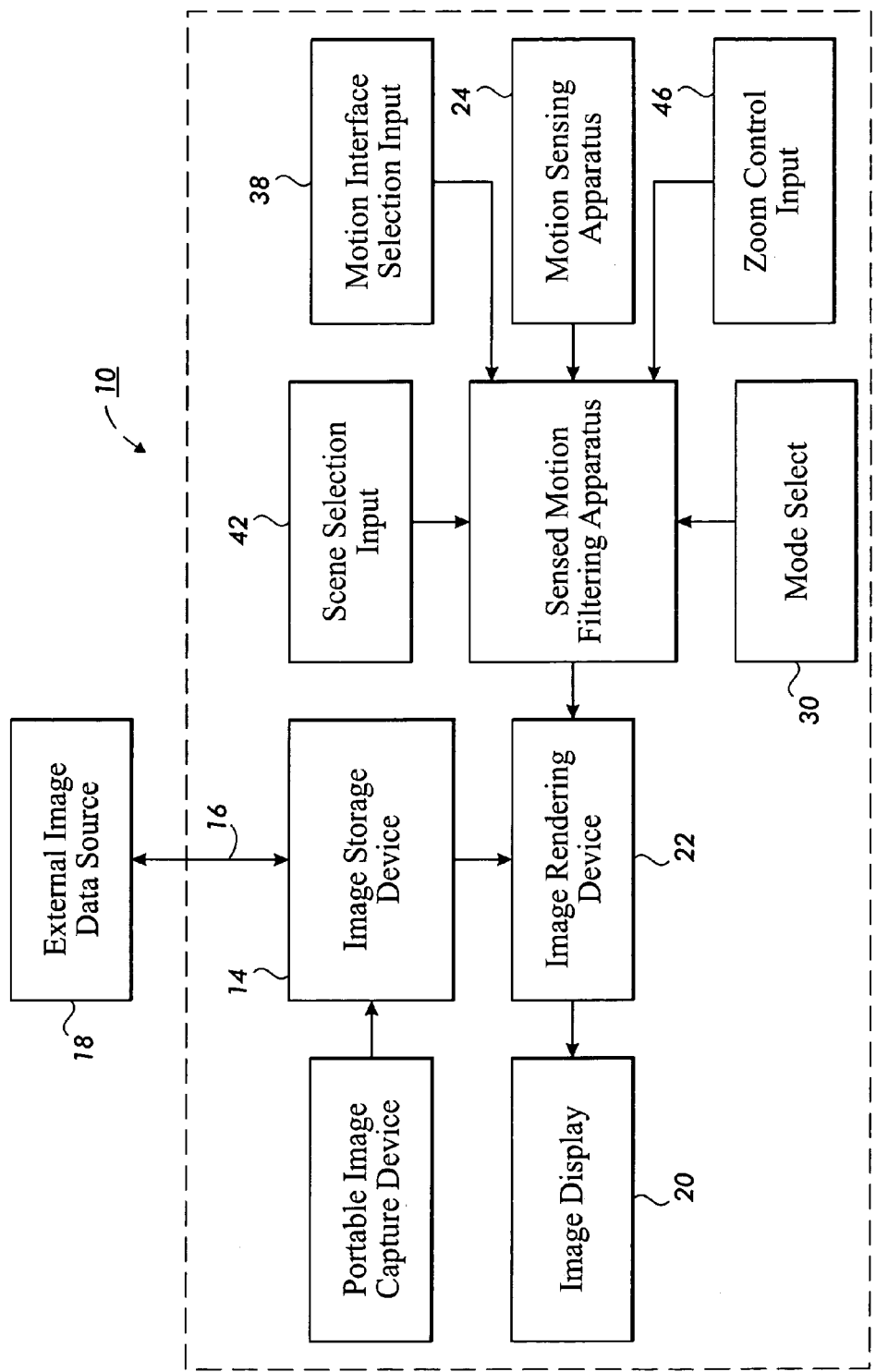
FIG. 2 is a schematic block diagram of a section of the camera for displaying stored images.

As explained above, zoom control may be provided by movement of the camera 10 in a direction parallel to the axis 26 if the motion sensing device 24 is capable of detecting movement in that direction. In addition, or alternatively, a separate zoom control input device 46 may be provided (shown optionally in FIG. 2), for example in the form of push buttons, or a variable analog device. This may conveniently be the same zoom control as that provided for zooming during image capture.

Figure 5A:
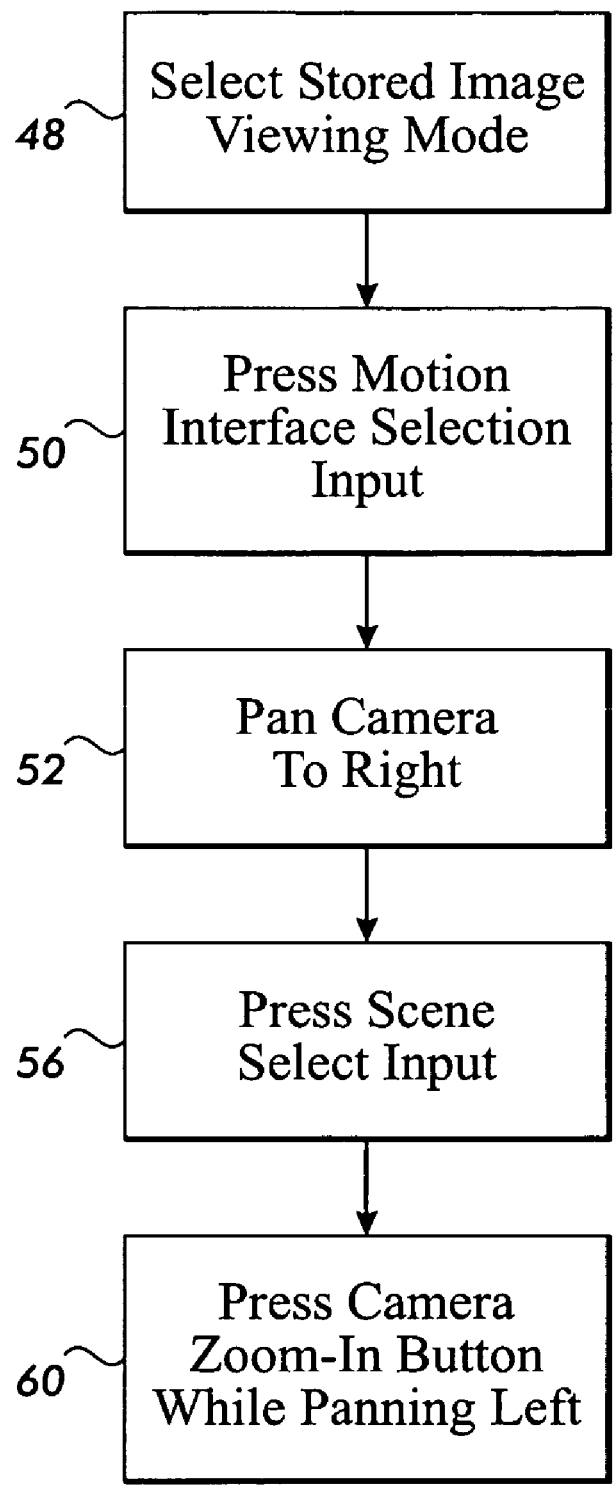
FIGS. 5A and 5B show schematically an image viewing process.
Figure 5B:
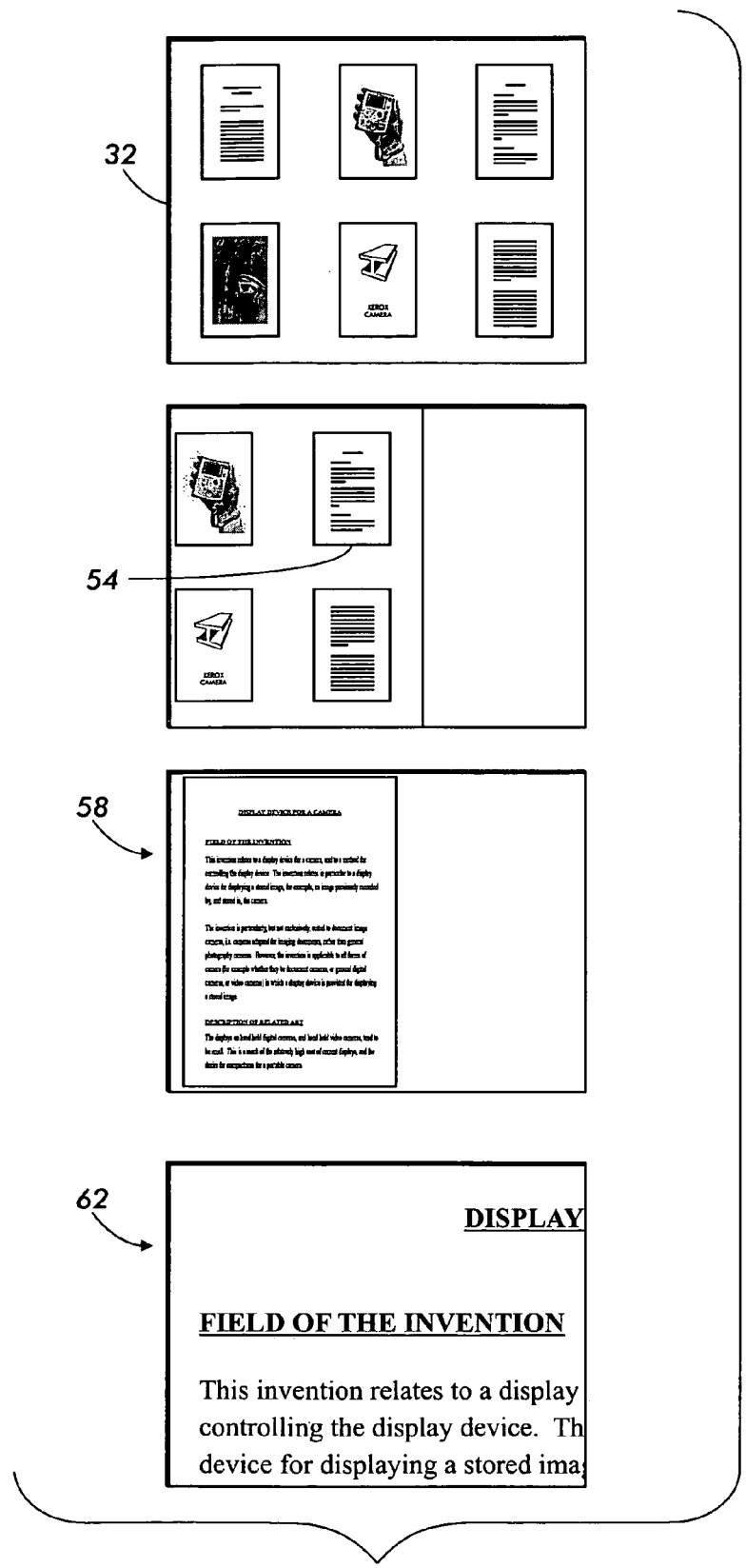

A typical example of image selection and viewing will now be described with reference to FIGS. 5A and 5B. Firstly, at step 48, the user operates the mode input button 30 to set the camera in the selection mode in which the selection scene 32 is generated and displayed on the display device 20.

Next, at step 50, the user operates the motion interface selection button 38 to enable motion control of the image and, at step 52, the user moves the camera to pan right. As explained above, such movement could either be movement of the camera rightwards, or it may be tilting the camera to the right. This causes the image to move leftwards in the display device 20, bringing the rightmost thumbnail view 34 to the top center of the display (indicated at 54).

Next, at step 56, the user presses the scene selection input button 42, to select the currently centered image thumbnail 34 for display. The stored image corresponding to the selected thumbnail view is retrieved, and displayed by the display device 20 (indicated at 58).

Next, at step 60, the user zooms in to enlarge a portion of the image, while panning the image left, i.e. to zoom towards the top left of the document image (indicated at 62). The zoom may be effected either by moving the camera in a direction parallel to the axis 26, or by operating the camera's zoom input buttons 46. The panning left is effected by appropriate movement of the camera 10, for example movement leftwards or tilting to the left.

If desired, the same form of boundary "wrapping" may be used for the stored image as that described above for panning of the selection scene 32. This would enable a single column document to be read simply by moving the camera in a single direction, rather than by repeated left-right motions of the camera. However, the reader is not forced to use this manner of reading if the repeated left-right motion for reading is preferred.

It will be appreciated that, as illustrated above, the image icons/thumbnails and the stored images themselves, can be reviewed quickly and easily. To the user, many of the control operations are simply movements which the user would make if viewing the images through a lens or window. This can provide a highly intuitive manner of operation.

When displaying video clips, one might have the option of adding the motions that the camera makes at the time of playback to the motions made when the clip was acquired (if those motions were recorded, for example, by the motion sensing device 24 of the camera). Thus, were the camera panned at some point during the original recording, a fixed viewpoint could be maintained in the playback (within the limits of the image actually recorded).

A first example of a motion sensing device 24 is now described with reference to FIG. 6. This first example merely detects motion in two dimensions (called the x-y dimensions) perpendicular to the axis 26 (FIG. 1).

The motion sensing device comprises accelerometers 70 arranged within the camera 10 to sense accelerations in the x-y directions, i.e. directions generally parallel to the plane of the display device 22. A suitable accelerometer is the Analog Devices ADXL50. The output from the accelerometers is fed through a band-pass filter 72. The low frequency cut-off characteristic of the bandpass filter removes the effect of gravity (as a constant acceleration), and the high frequency cut-off characteristic is chosen to remove the effects of noise, human jitter and accidental vibration of the camera. The filter bandwidth in this embodiment is about 1–10 Hz, and is chosen to match human head motion, which averages about 3.5–8 Hz.

The output from the bandpass filter 72 is fed to a first integrator 74 which integrates the acceleration signal to produce a velocity signal. The first integrator 74 has an exponential decay to reduce drift.

The velocity signal is then fed to a multiplier 76 which multiplies the velocity by a factor k which is a function of the current zoom setting of the image rendering circuit 22 (i.e. the extent to which the currently displayed image is zoomed). The purpose of the factor k is to vary the panning speed depending on the current level of zoom. The factor k is smaller for higher zooming, such that the motion detection system becomes less sensitive to x-y acceleration when the image display is zoomed in, and hence more convenient for the user. The factor k is determined by a virtual velocity gain circuit 78 which receives a zoom input from a zoom control input device 46.

The multiplier 76 also receives an enable control signal from the motion interface selection input device 38. The control signal is either zero (motion interface disabled) or one (motion interface enabled), which is used to multiply the velocity signal in the multiplier 76. This is effectively a switch for switching on or off the signal from the multiplier.

The output from the multiplier 76 is fed to a second integrator 80 which integrates the velocity signal to a position signal. The second integrator also has an exponential decay to reduce drift. The output from the second integrator 80, and the output from the zoom control input device 46 are fed as x, y and z coordinates to the image rendering circuit 22, with x and y representing the current panning position within the image, and z representing the level of zoom.

Figure 6:
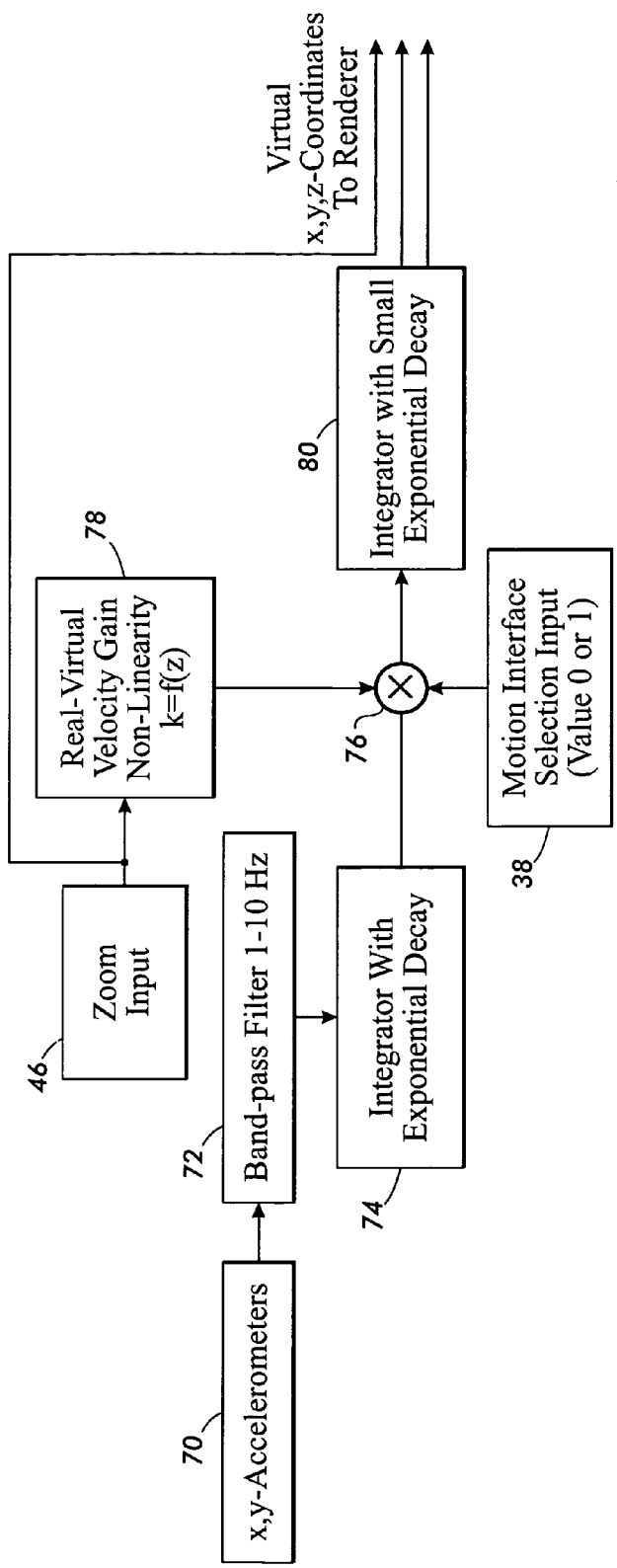
FIG. 6 is a schematic block diagram of an example motion sensor used in the camera.

Although only a single schematic channel is illustrated in FIG. 6, it will be appreciated that separate processing channels are provided for the x and y signals.

Figure 7:
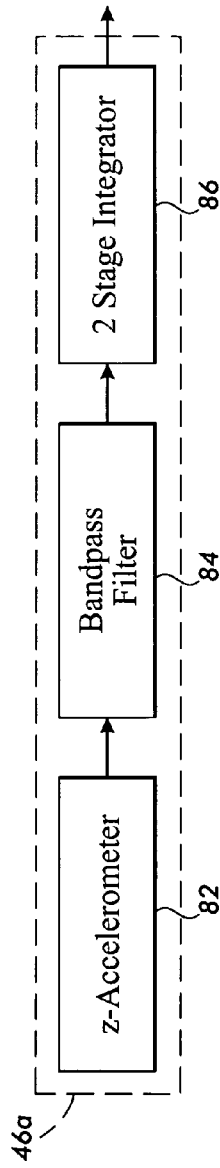
FIG. 7 is a schematic block diagram of an alternative zoom control for use in the motion sensor of FIG. 6.

FIG. 7 illustrates an alternative zoom input circuit 46a as an alternative to the manually operated zoom circuit 46 in FIG. 6. The circuit of FIG. 7 includes an accelerometer 82 mounted for sensing acceleration in the "z" direction, i.e. parallel to the axis 26 (FIG. 1). The output from the accelerometer 82 is fed through a bandpass filter 84 similar to the filter 72, and through a two stage integrator 86 which doubly integrates the acceleration signal to a "z" position signal indicative of the level of zoom. The output from the input circuit 46a can be fed to the virtual velocity gain circuit 78 and to the image rendering circuit 22.

In the motion sensors illustrated in FIGS. 6 and 7, the effect of gravity is removed by bandpass filtering. As an alternative, the motion sensing device 24 could include a gyroscope, or use integrated rotational accelerometers, to estimate the gravity direction. Such a technique is described, for example, in IBM Systems Journal, Vol. 35, 1996.

Also, some accelerometers tend to have poor response at low frequencies. If such accelerometers are used, then remedial action to remove the effect of gravity might be unnecessary.

It will be appreciated that the foregoing description is merely descriptive of preferred non-limiting embodiments of the invention, and does not limit the invention in any way. The skilled man will appreciate that many equivalents and modifications may be used without departing from the scope and spirit of the invention.

What is claimed is:

1. A camera for accessing and viewing document images, comprising:

a mode select for selecting a scene selection mode of operation of the camera;

a display device for producing a visual display of a first image representing a stored document image, or of a selection scene including an arrangement of a plurality of icons, where at least one of the icons in the arrangement of icons represents the stored document image;

a motion detector for detecting motion of the camera when the first image or the selection scene are displayed on the display device;

an image generator communicating with the mode select, the display device, and the motion detector for controlling selection of the stored document image within the selection scene by motion of the camera detected by the motion detector;

wherein the image generator in accessing and viewing the stored document image:

(a) generates a selection scene for display on the display device of the camera in response to user input selecting the scene selection mode with the mode select;

(b) receives input from the motion detector indicating movement of the camera when the selection scene is displayed on the display device to control a first panable window of the arrangement of icons making up a portion of the selection scene displayed on the display device;

(c) in response to scene selection input selecting the at least one of the icons in the selection scene portion displayed in the first panable window of the selection scene, retrieves the stored document image represented by the selected icon and replaces the selection scene on the display device of the camera with the first image representing retrieved the document image;

(d) in response to input from the motion detector indicating movement of the camera when the first image is displayed on the display device, controls what portions of the document image are displayed in a second panable window, containing only a portion of the document image displayed on the display device, such that the second panable window wraps the first image on the display device as a continuous loop that repeats at boundaries of the document image.

2. A camera according to claim 1, wherein selection of the at least one icon in the selection scene is based on its position in the portion of the selection scene displayed on the display device.

3. A camera according to claim 2, wherein the image generator wraps in the first panable window the selection scene displayed on the display device as a continuous loop that repeats at boundaries of the selection scene when only a portion of the selection scene is displayed on the display device.

4. A camera according to claim 3, wherein the image generator pans the first image relative to the stored document image in response to detected motion of the camera when the detected motion for panning is movement of the camera in a plane generally parallel to said display device.

5. A camera according to claim 3, wherein the image generator pans the first image relative to the stored document image in response to detected motion of the camera when the detected motion for panning is tilting of the camera to change the attitude thereof.

6. A camera according to claim 3, wherein the image generator zooms the first image relative to the stored document image.

7. A camera according to claim 6, wherein the image generator controls the zoom factor of the first image relative to the stored document image in response to detected motion of the camera.

8. A camera according to claim 7, wherein the detected motion for zoom control is movement of the camera in a direction generally perpendicular to a plane of the display device.

9. A camera according to claim 6, wherein the image generator and the motion detector control a panning speed for panning the first image relative to the stored document image, in response to a zoom factor of the first image.

10. A camera according to claim 1, wherein the image generator varies the plurality of icons representing stored images in the selection scene displayed on the display device depending on their corresponding stored image size.

11. A camera according to claim 1, further comprising a filter for filtering jitter from the detected motion.

12. A camera according to claim 1, wherein the motion detector comprises at least one accelerometer.

13. A camera according to claim 12, further comprising a filter for compensating the output from the accelerometer or accelerometers for gravity.

14. A camera according to claim 1, wherein the motion detector comprises at least one attitude sensor.

15. A camera according to claim 1, wherein the motion detector comprises an optical sensor for detecting motion by correlation with a detected optical scene.

16. A camera according to claim 1, wherein the first image is a video image recorded by the camera while recording motions of the camera using the motion detector.

17. A camera according to claim 16, wherein image generator plays back the video image using the recorded motions of the camera.

18. A camera according to claim 17, wherein image generator plays back the video image while maintaining a fixed viewpoint of the video image using the recorded motions of the camera that recorded the motion.

19. A method for accessing and viewing document images using a camera having a display device and a motion detector, comprising:

generating a selection scene for display on a display device of the camera in response to user input selecting the scene selection mode;

sensing first movement of the camera with the motion detector when the selection scene is displayed on the display device to control a first panable window of the arrangement of icons making up a portion of the selection scene;

receiving scene selection input selecting at least one of the icons of the selection scene in the first panable window;

in response to the scene selection input, retrieving a stored document image represented by the selected icon and replacing the selection scene on the display device of the camera with a first image representing retrieved the document image;

sensing second movement of the camera with the motion detector when a second panable window of the first image is displayed on the display device of the camera that records only a portion of the document image;

responsive to sensing the second movement of the camera when the second panable window is displayed, controlling what portions of the document image are displayed in the second panable window on the display device, such that the second panable window wraps the first image on the display device as a continuous loop that repeats at boundaries of the document image.

20. The method according to claim 19, performing one of a zoom operation and a pan operation to the document image relative to the portion of the document image displayed in the second panable window in response to sensing the movement of the camera.

21. The method according to claim 19, wherein selection of the at least one icon in the selection scene is based on its position in the portion of the selection scene displayed on the display device.

22. The method according to claim 21, further comprising wrapping in the first panable window the selection scene displayed on the display device as a continuous loop that repeats at boundaries of the selection scene when only a portion of the selection scene is displayed on the display device.

* * * * *